Oct. 8, 1940.　　　　F. D. MAHONE　　　　2,216,977
METHOD AND APPARATUS FOR CONTROLLING THE
RELATIVE QUANTITIES OF LIQUIDS IN A TANK
Filed May 11, 1937　　　2 Sheets-Sheet 1

INVENTOR
FRANCIS D. MAHONE
BY
HARRIS, KIECH, FOSTER & HARRIS

ATTORNEYS.

INVENTOR
FRANCIS D. MAHONE
BY HARRIS, KIECH, FOSTER & HARRIS

Florence F. Kiech

ATTORNEYS.

Patented Oct. 8, 1940

2,216,977

UNITED STATES PATENT OFFICE 2,216,977

METHOD AND APPARATUS FOR CONTROLLING THE RELATIVE QUANTITIES OF LIQUIDS IN A TANK

Francis D. Mahone, Long Beach, Calif., assignor, by mesne assignments, to Petrolite Corporation Ltd., Wilmington, Del., a corporation of Delaware Application May 11, 1937, Serial No. 142,076

10 Claims. (Cl. 210—54)

My invention relates to a novel method and apparatus for controlling the relative amounts of two liquids of different density in a container and, more particularly, to a water level control system finding particular utility in conjunction with an electric treater, such as a dehydrator.

It is often desirable to control rather accurately the relative amounts of such liquids in a container, yet considerable difficulty has been encountered in providing a satisfactory system. In this connection, it will be clear that, if the liquids in the container are undergoing gravitational separation, it is quite possible that no clean interface will be formed therein. By way of example, the oil and water phases of an emulsion undergoing separation in a tank or container will form relatively pure superimposed bodies separated by a layer of sludge or a mixture of the two materials, which prevents formation of a clean oil-water interface desirable for purposes of indication or control. By establishing superimposed columns of such liquids respectively drawn from the upper and lower ends of the container and existing in a passage of such character as to maintain the interfacial zone separated from the contents of the container, it is possible to obtain a clean interface well adapted for use with an indication or control system.

It is an object of the present invention to provide a novel method and apparatus whereby a cleaner interface can be maintained and used for indicating or control purposes than would be the case if an endeavor were made to correspondingly indicate or control with reference to an interface in the container.

Another object of the invention is to form an auxiliary interface in a separate upright passage so that the auxiliary interface is separated from the contents of the container which are opposite this auxiliary interface. The interfacial zone in which the auxiliary interface is positioned may be outside or inside the container. If inside, suitable upright walls separate the interfacial zone from the liquids in the container.

It often happens that the liquids in the container exist at superatmospheric temperature and it is an object of the present invention to apply heat to the contents of such an upward-extending passage to maintain the temperature of the interfacial zone substantially the same as the temperature of the contents of the container.

It is another object of the invention to transfer heat between the interfacial zone and the contents of the container. This may be accomplished in any one of several ways falling within the scope of the present invention. For instance, one or more of the liquids in the container may be circulated in heat-transferring relationship with the interfacial zone or with one or both of the columns of liquid therein. The liquid or liquids thus circulated in heat-transferring relationship with the upright passage, or the contents thereof, may move either inside or outside the container. Various other methods and apparatus can be used to correlate the temperature in the interfacial zone and the temperature of the contents of the tank or container within the scope of the present invention.

It is another object of the present invention to provide a method and apparatus whereby the contents of such an upright passage can be periodically bled off, or whereby the passage can be periodically flushed out.

It is an object of the present invention to provide a method and apparatus whereby one or both of the liquids in the container may be withdrawn at such rate as to maintain substantially constant the position of the interface in such an upright passage.

It is a further object of the invention to provide a novel electrical control for withdrawing one or more liquids from the container in response to a change in position of the auxiliary interface in the interfacial zone.

Another object of the invention is to provide a novel float-control system for withdrawing one or more liquids from a container in response to the position of such an auxiliary interface.

Further objects and advantages of the invention will be made evident hereinafter.

The invention has utility in conjunction with various tanks, containers, treaters, etc., but will be particularly described and illustrated with reference to its use in conjunction with an electric dehydrator.

Referring to the drawings, Fig. 1 is a vertical sectional view of an electric dehydrator equipped with one embodiment of the invention.

Figure 1:
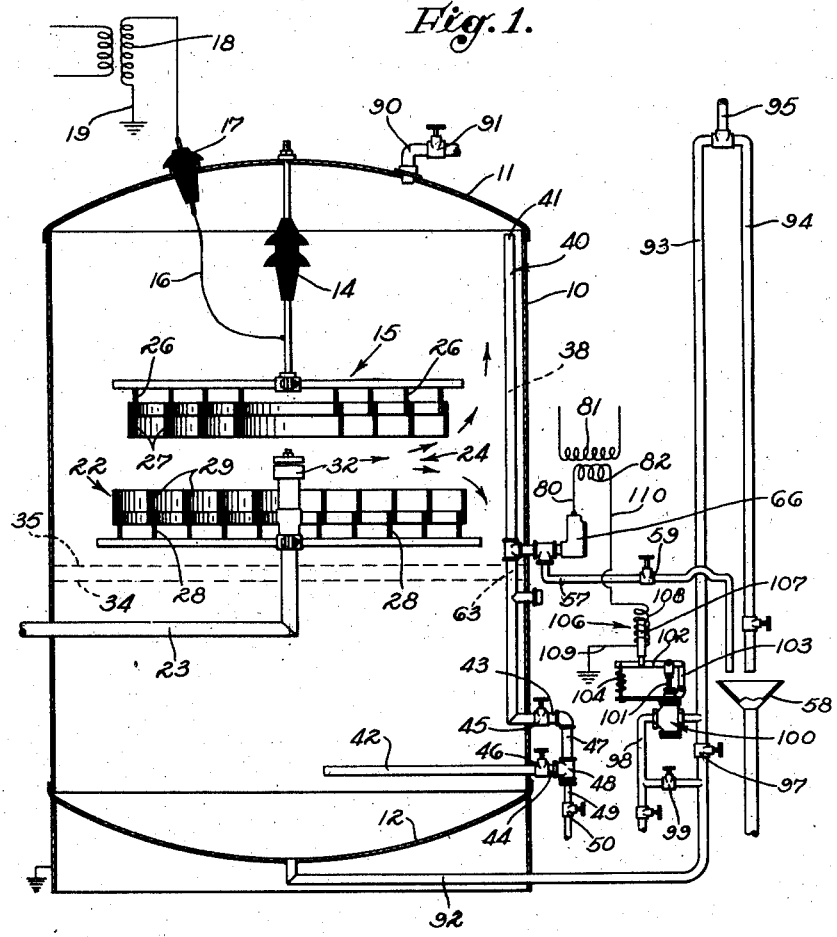

Referring particularly to Fig. 1, the dehydrator provides a tank or container 10 closed at its upper end by a dome 11 and, at its lower end, by a bottom 12. Suspended therein, from an insulator 14, is an upper electrode structure 15 energized from a conductor 16 extending through a bushing 17 and connected to a high voltage source, such as a transformer 18. One terminal of such a source may be grounded as indicated at 19 and thus electrically connected to the container 10, which is also grounded. A lower electrode structure 22 is electrically connected to the tank and supported therein by a distributor pipe 23 or by other means. The potential difference maintained between the electrodes 15 and 22 establishes an intense electric field in a treating space 24.

The structure of these electrodes is not per se a part of the present invention. As shown, the upper electrode structure provides depending rods 26 supporting a plurality of concentric rings 27. Similar upward-standing rods 28 of the lower electrode structure support concentric rings 29. The most intense portions of the field in the treating space 24 will be along lines connecting the most extended edges of the two sets of concentric rings.

The crude oil emulsion to be dehydrated flows through the pipe 23 and is preferably distributed in the container 10 in such manner as to cause some circulation of the liquids therein. One way of accomplishing this is to use a centrally-disposed emulsion distributor 32 which provides an annular passage through which the emulsion moves outwardly in the treating space 24. Such a discharge tends to establish a circulation, as indicated by the arrow in Fig. 1.

When the emulsion enters the electric field, the dispersed water droplets are coalesced into larger masses and tend to gravitate downward to the lower end of the container 10, either through the annular spaces between the rings of the lower electrode or through the space between the outer ring thereof and the container 10. The oil phase tends to rise to the upper end of the container 10, either through or around the upper electrode structure 15. Correspondingly, a body of water collects in the lower end of the container and a body of oil in the upper end thereof.

Such a dehydrator is one example of a container in which exist two liquids of different density and undergoing gravitational separation. In such a system, it is practically impossible to obtain a clean and definite oil-water interface in the container. The water in the lower end thereof will be a homogenous body, with a surface or water level indicated by the numeral 34. However, immediately above this water level and between the body of water and the body of oil will be found a layer of sludge or a body of treated emulsion in the process of separating, which comprises essentially a loose mixture of oil and water. This sludge or treated emulsion may exist, for instance, between the dotted line 34 and the dotted line 35.

Practically the same action takes place in other containers in which two liquids are undergoing gravitational separation, though often in lesser degree. An oil tank, for instance, may receive a mixture of oil and a minute quantity of water and this water will gradually tend to settle to form a body of water in the lower end of the tank and a thin layer of sludge separating this body of water from the body of oil. Other liquids of different densities evidence the same phenomenon.

In any such system, it is very difficult to obtain an accurate indication of the actual water level. If an attempt is made to use a float which will sink in oil but float on water, such a float lies in or passes through such a sludge layer and an accurate determination cannot be obtained. If an attempt is made to indicate the water level by electric means, for instance by an electrode maintained at a potential above the potential of the water, it will be found that this sludge layer often interferes with proper operation of the system. For example, current will flow from the electrode to the water through the sludge layer as the water level approaches the electrode, thus giving rise to erroneous conclusions, if the current is relied upon as an indication of the actual water level.

To eliminate this difficulty, I provide an auxiliary water level or an auxiliary interface which can be maintained relatively clean and clearcut. This is accomplished by providing an upright passage inside or outside the container, or partially inside and outside this container. The upper end of such an upright passage communicates with the body of lower density liquid in the upper end of the container, and the lower end communicates with the body of liquid of higher density in the lower end of the container. Columns of these relatively pure liquids are thus formed in this upright passage and contact at an interface which rises and falls in an interfacial zone in response to a change in the relative amounts of the two liquids in the container, or to a change in the main water level in the container.

Figure 2:
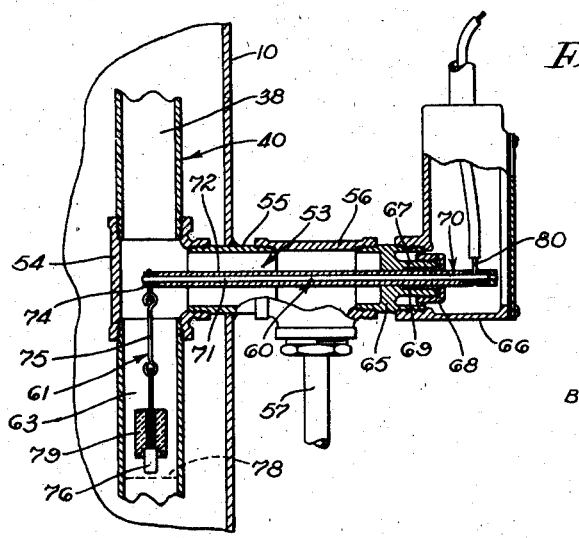
Fig. 2 is an enlarged sectional view of the electrode means utilized in Fig. 1.

In Figs. 1 and 2, such an upright chamber is indicated by the numeral 38 and is inside the container 10 throughout substantially its complete length. As best shown in Fig. 1, this chamber is provided by a pipe means 40, with an upper end 41 communicating with the body of oil, and a lower end 42 communicating with the body of water. Near its lower end, this pipe means is shown as extending through the container 10 to a position outside thereof by use of outward-extending pipes 43 and 44, respectively provided with valves 45 and 46 and connected by pipe 47, all of these pipes 43, 44 and 47 forming a part of the pipe means 40. The pipes 44 and 47 are joined by a T 48 to which is also connected a pipe 49 provided with a valve 50. That portion of the pipe means 40 which lies outside the container 10 provides a bleeder or flushing zone from which liquid can be removed through the pipe 49 when the valve 50 is opened.

Referring particularly to Fig. 2, a side passage 53 opens on the upright passage 38 and extends to the outside of the container 10. A convenient way of providing such a side passage is to secure a T 54 in the pipe means 40 at a desired elevation and attach thereto a nipple 55 which extends through and is welded to the container 10. Another T 56 may be secured to the nipple 55 and to a drain pipe 57 discharging into a funnel 58, as controlled by a valve 59.

Removably extending sidewise into this side passage 53 is a connector means 60 which provides a flexible conductor means 61 as one portion thereof of such character as to be insertable into the upright passage 38 through the side passage 53 and drop downward into an interfacial zone 63 of this upright passage.

Fig. 2 best illustrates the structure preferably used in this capacity. As there shown, a closure member 65 is threaded into the T 56 and also into a junction box 66. The closure member 65 carries a threaded sleeve 67 which receives a cap 68. Extending therethrough and surrounded by a packing 69 compressed by the cap 68 is a rod means 70 forming a part of the connector means 60. This rod means is shown as including a rod 71 surrounded by a tube of insulating material 72, though the insulating material can sometimes be dispensed with if other means is provided for insulating the rod 71 from the grounded container 10.

The rod 71 extends into the upright chamber 38 and carries a grooved head member 74. The flexible conductor means 61 depends therefrom when the connector means 60 is in the position shown in Fig. 2. A very satisfactory way of forming this flexible conductor means is to utilize a plurality of links 75, the upper of which rests in the groove of the head member 74 and the lower of which carries a contact electrode 76 which is contactible by the water when the auxiliary water level rises in the interfacial zone of the upright chamber 38. This auxiliary water level or interface is indicated in Fig. 2 by the numeral 78. To maintain the flexible conductor means 61 out of electrical contact with the pipe means 40, I provide a suitable insulator means disposed around the lower end thereof. Such an insulator means may be secured to the pipe means 40 or may be carried by the link itself, the latter embodiment being illustrated in Fig. 2 wherein an annular insulator 79 loosely surrounds the lower link and normally rests against the contact electrode 76, as shown.

That end of the rod 71 extending into the junction box 66 is electrically connected to a conductor 80, which is in turn connected to a source of potential which maintains the contact electrode 76 at a potential above ground. Such a source is indicated in Fig. 1 by the transformer 81 providing a primary winding which can be connected in parallel with the primary winding 18. The conductor 80 is connected to one terminal of a secondary winding 82. Any suitable circuit means is connected to the other terminal of this secondary winding to indicate the position of the auxiliary interface 78 or to control the position thereof. A typical control circuit will be hereinafter described.

It will thus be clear that such an electrode 76, with its associated flexible conductor means 61, can be inserted sidewise into the upright passage 38 and can be similarly removed therefrom. When being thus inserted, the connector means 60 may be priliminarily attached to the closure member 65 and moved into the side passage 53, with the links of the flexible conductor means 61 in horizontal position. Further inward movement of the connector means 60 will permit the contact electrode 76 to drop downward into the interfacial zone 63. At this time, the closure member 65 can be screwed into the T 56. The grooved head member 74 permits the flexible conductor means 61 to depend therefrom, regardless of the turning of this electrode means. Such a chain-like structure, which will drop downward in the passage 38, has been found to be very advantageous.

If the invention is to be used to control the relative quantities of the two liquids in the container 10, or to control the position of the water lever 34, it is desirable to withdraw one or both of the liquids from the container at such rate as to maintain the position of the auxiliary interface 78 substantially constant. In dehydration practice, it is possible to control both the withdrawal of oil and water in response to the position of the auxiliary interface 78 and this concept is included within the present invention. However, it is usually sufficient to control the withdrawal of only one liquid. In the dehydrator shown, the treated oil may be continuously withdrawn through a pipe 90, as controlled by the manual setting of a valve 91. The water can be withdrawn from the lower end of the container through a pipe 92 connected to a stand pipe 93 and to a discharge pipe 94. The height of the stand pipe should preferably be slightly above the uppermost portion of the container 10 and is preferably provided at its upper end with a vent 95 to prevent syphoning action.

Various types of withdrawal-control means may be utilized to control the amount of water moving through the pipes 92, 93 and 94 and discharging into the funnel 58. In the embodiment shown, the stand pipe 93 provides a master valve 97 with a pipe means 98 by-passing same and provided with a valve 99. By adjusting the valves 97 and 99, any desired portion of the water can be caused to move through the by-pass pipe 98.

Disposed in this by-pass pipe is a valve means 100, shown as being of the electrically controlled type. As diagrammatically illustrated, this valve means provides a stem 101 pivoted to an arm 102 which is in turn connected by a link 103 to the body of the valve means 100. A spring 104 normally tends to move the valve means toward closed position. A solenoid 106 is operatively connected to the valve means. As diagrammatically illustrated, this solenoid includes a plunger 107 surrounded by a winding 108. When the winding is energized, the solenoid moves upward and the valve is moved toward its open position against the action of the spring 104. One terminal of this winding 108 may be grounded, as indicated by the numeral 109, and the other terminal may be connected to the secondary winding 82 through a conductor 110.

The mode of operation of this embodiment of the invention is as follows:

Assuming that the treater has been in operation for a period of time, the upper end of the container 10 will retain a body of relatively dry oil and the lower end will contain a body of water with an upper surface indicated by the dotted line 34. This upper surface lies opposite the interfacial zone 63 of the passage 38. But, there will be no definite interface in the main portion of the container 10 due to the accumulation of sludge previously mentioned. However, there will be a very definite and clean interface in the interfacial zone 63 due to the fact that columns of oil and water have entered the upright passage 38 through its upper and lower ends, and due to the temperature correlation to be later discussed.

If the relative amount of water in the container 10 increases or if the water level 34 therein rises, it will be clear that the auxiliary interface 78 will correspondingly rise, for the upper and lower ends of the pipe means 40 are in open communication with the bodies of oil and water. When this auxiliary interface 78 reaches the contact electrode 76, a circuit will be completed from one terminal of the secondary winding 82 through the conductor 110 and the solenoid winding 108 to ground, the current then flowing from the grounded pipe means 40 through the water in the interfacial zone 63 and through the contact electrode 76, the flexible conductor means 61, the rod means 60 and the conductor 80 to the other terminal of the secondary winding 82.

This will move the valve means 100 toward open position and permit water, or an additional amount of this water, to move through the pipe 92, thus lowering the auxiliary interface 78 until it separates from the contact electrode 76 to break the circuit, at which time the valve means 100 moves toward its closed position. In this connection, it is usually desirable to close the valve 97 so that all of the water will move through the by-pass pipe 98 and the valve means 100. In this instance, the valve means may be of the type which moves from a completely closed position to a completely open position when the solenoid winding 108 is energized, or it may be of the type provided with a suitable stop means for preventing complete closure of this valve means, even when the solenoid winding 108 is not energized. In the latter instance, a certain quantity of water will continuously move from the container but this quantity will be increased sufficiently to lower the auxiliary interface 78 when the solenoid winding 108 is energized. On the other hand, it is sometimes desirable to operate the system so that the valve 97 is partially open to provide a constant flow therethrough and to utilize the valve means 100 for increasing this flow to a degree sufficient to lower the auxiliary interface 78.

One of the important features of the present invention is the heat correlation between one or more of the liquids in the upright pasage 38 and the contents of the container 10, particularly when the temperatures of the liquids in this container are above atmospheric. On certain oils, tests have adequately demonstrated that even the provision of an auxiliary interface 78 will not permit accurate control unless such temperature correlation is substantially maintained. In considering the desirability of heat correlation, the following factors should be kept in mind.

In the first place, if the liquids in the upright passage 38 are permitted to cool materialy below the temperature in the container, it will be found that the gravity differential between the two liquids will not remain constant. Application of equivalent amounts of heat to oil and water will cause the oil to expand faster than the water and thus upset the gravity differential and cooling will also upset the gravity differential. If the liquids in the container 10 exist at superatmospheric temperature, it is thus very desirable that the temperature of the columns of oil and water in the upright passage 38 be substantially the same, otherwise the gravity differential in the upright passage 38 will not be the same as in the main portion of the container 10. Thus, such temperature correlation permits an accuracy not heretofore known and permits better correlation between the position of the auxiliary interface 78 and the relative amounts of the two liquids in the container 10.

In the second place, heat correlation is desirable from the standpoint of controlling the viscosity of the oil in the interfacial zone and in the oil column in the upright passage 38. It must be recognized that, in such a system utilizing hydrostatic pressures to change the position of the auxiliary interface 78, the available pressures causing flow into and through this upright passage are very low. If the column of oil in this passage is permitted to cool, it will become more viscous. Such an increase of viscosity will impede flow into and along the upright passage 38, both because the oil will tend to cling to the walls of this passage and because the molecules of the oil will not move relative to each other with the same ease as when the viscosity is lower. By applying heat to the interfacial zone and to the column of oil thereabove and by correlating the temperature with the temperature of the contents of the container 10, this difficulty with viscosity is materially reduced and usually entirely eliminated. In many instances, it is not necessary to directly heat the oil column, for application of heat at the interfacial zone will sometimes be sufficient. In this instance, the heat will rise from the interfacial zone into the oil column and thus increase the temperature thereof.

In the third place, if the oil column in the upright passage 38 is permitted to cool, there will be formed on the contact electrode 76 a film of oil which is sometimes difficult to pierce. In this connection, it will be clear that the contact electrode will be coated with oil when the auxiliary interface 78 drops to a position therebeneath. When this interface rises, the oil film will act as a temporary insulator and must be ruptured. Such rupturing will usually not take place when the auxiliary interface 78 first reaches the lowermost portion of the contact electrode 76 unless sufficiently high potentials are used to effect this result. In the absence of such high potentials, the auxiliary interface will continue to rise and, when the contact electrode 76 is sufficiently submerged, the oil film will rupture and the circuit will be completed. In the absence of heat correlation, this depth of submergence will often be found too large to give accurate and satisfactory results. Heat correlation will decrease the viscosity of the oil and thus coat the contact electrode 76 with a much thinner film. This thinner film will readily rupture at a very low depth of submergence. Thus, heat correlation will tend to give more accurate indication or control through decreasing the total vertical movement of the auxiliary interface 78 necessary to complete the electric circuit.

In the fourth place, it is very desirable that the auxiliary interface 78 be maintained relatively clean. Application of heat to the interfacial zone 63 will tend to resolve the sludge which tends to gradually accumulate adjacent the auxiliary interface.

A cleaner interface and better operating conditions can also be insured by proper control of the potential applied to the contact electrode 76. It has been found that, if a low potential is applied, e. g., from a few volts up to 100 volts, scale will be formed on the contact electrode 76. Such scale prevents accurate control by surrounding the contact electrode 76 with a scale which is not as conductive as the electrode itself. However, if higher voltages are used, this scaling will be effectively prevented. Such higher voltages are also effective in better rupturing the oil film on the contact electrode and, in addition, act to electrically treat any sludge which accumulates, thus tending to resolve it and maintain a cleaner interface. Voltages from 120-440 will be found to be quite satisfactory. Potentials in the neighborhood of 220 volts give very satisfactory results. Such potentials may be derived from an alternating current or a direct current source, the former being preferred because of its availability in the field.

Even by using these expedients, it may still be found, on certain oils, that a sludge layer will gradually build up adjacent the auxiliary interface 78. In such instances, it is desirable to periodically flush the upright passage 38, or a portion thereof, so as to withdraw the sludge or form new columns of the dissimilar liquids therein. If it is desired to withdraw liquid from an intermediate portion of the pipe means 40 near the interfacial zone 63, this can be accomplished by periodically opening the valve 59. In some instances, the system can be so designed that this flushing expedient will draw new columns of oil and water into the upright passage 38.

Usually, however, I find it desirable to withdraw liquid from the flushing zone formed by that portion of the pipe means 40 which is positioned outside the container 10. Thus, if the valve 46 is closed and the valve 50 opened during the time that the valve 45 is also open, the water and oil will drain through the pipe 49, together with any incidental sludge which may have accumulated. This will fill substantially all of the pipe means 40 with a fresh supply of oil. In some instances, it is also desirable at this time to close the valve 45 and open the valve 46 so as to flush out the pipe 42. In any event, when the valves 45 and 46 are again opened, after closing the valve 50, water will flow into the lower end of the pipe means to displace some of the oil and form a fresh auxiliary interface 78 in the interfacial zone 63.

While it has been found expedient to form the pipe means 40 so that the bleeder zone is outside the container 10, this is not essential. If desired, the bleeder zone may be within this container and the valves 45 and 46 may be operated by means extending to the exterior of the container. In this instance, the pipe 49 may extend to the outside of the container.

Figure 3:
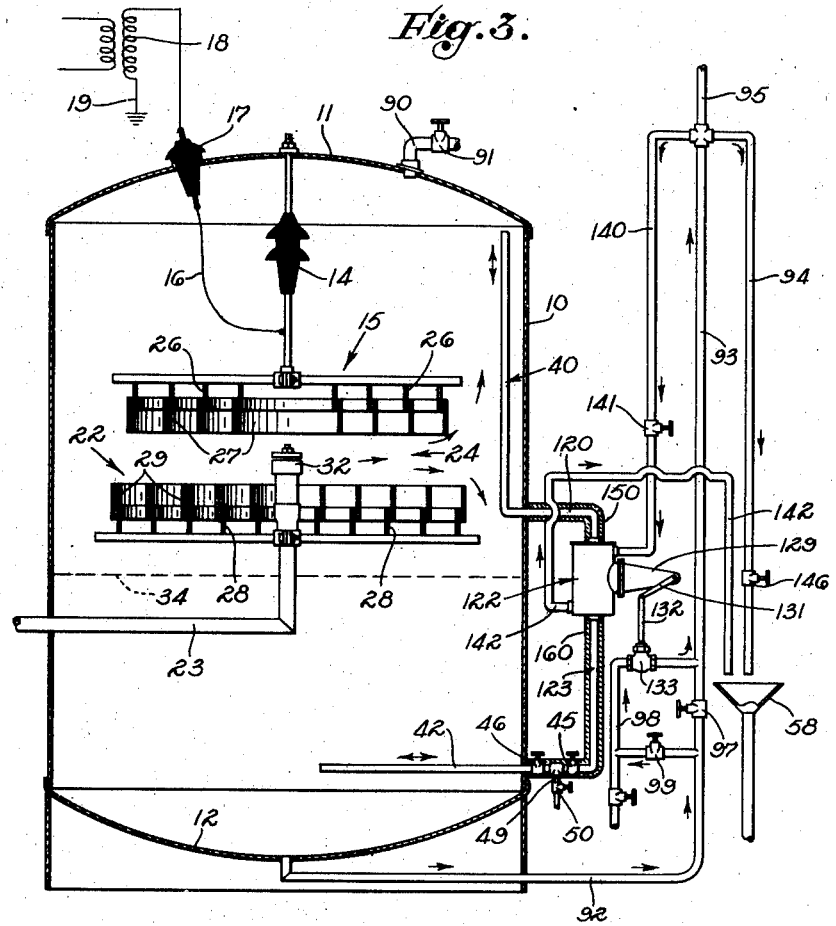
Fig. 3 is a sectional view of an electric dehydrator equipped with an alternative form of the invention.
Figure 4:
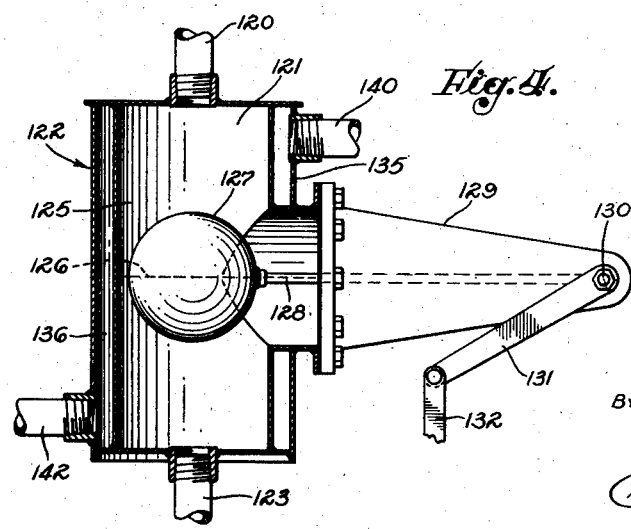
Fig. 4 is an enlarged sectional view of the float-contained interfacial zone of the apparatus shown in Fig. 3.

Such an electrically operated control system can be used with practically all oils. It has certain advantages over a float operated system but is usually more expensive to operate in view of the current consumed by the solenoid. In commercial practice, it has often been found desirable to utilize a float operated system, such as is shown in Figures 3 and 4. It will be found to operate best on high gravity, relatively non-viscous oils but is usually not satisfactory on low gravity viscous oils. The low gravity oils have a density very near the density of the water and it is difficult to secure proper control by use of a float which will sink in the oil but float on the water. Thus, in commercial practice, it is usually desirable to use an electrically operated system on low gravity oils, e. g. from 20 gravity down to 12 gravity, and on those oils which are relatively viscous. If the invention is used in conjunction with an electric dehydrator, it is found quite advantageous, particularly as the higher viscosity oils usually require considerable heat in the dehydrator, e. g. from 120 to 190° F. At the higher temperatures, heat correlation becomes increasingly important in view of the factors hereinbefore mentioned.

In utilizing a float controlled system, the embodiment shown in Figs. 3 and 4 has been found particularly advantageous. Here, the pipe means 40 extends downward inside the container and then outward, as indicated by the numeral 120, to communicate with a float chamber 121 formed by a float structure 122, best shown in Fig. 4. A downward-extending pipe 123 communicates with the lower end of the float chamber 121 and with the inward-extending pipe 42 to complete the pipe means 40. Suitable drainage means may be provided through the pipe 49 in conjunction with valves 45, 46 and 50, similar to those previously described.

The float chamber 121 forms an interfacial zone 125 corresponding to the zone 63 previously described except that it is somewhat larger in cross section. The auxiliary interface is indicated by the dotted line 126. A float 127 is disposed in the interfacial zone and is of such character as to sink in the oil but float on the water. An arm 128 is secured to the float and extends outward in a housing 129, being connected to a shaft 130 which extends to the outside of this housing through a suitable sealing means not shown. This shaft carries an arm 131 which is connected by a link 132 to a valve means 133 corresponding to the valve means 100 previously described. The water draw-off system is similar to that shown in Fig. 1 and is designated by corresponding numerals.

When the float 127 rises in response to an increase in the relative amount of water in the container, or in response to a rise of the water level 34 therein, the arm 131 will move in a clockwise direction to move the valve means 133 toward open position and thus cause or increase the flow of water from the container 10. Correspondingly, when the auxiliary interface 126 lowers, the valve means 133 will be moved toward closed position.

Heat correlation is particularly important in such a float operated system. In addition to the reasons set forth above, it will be clear that at least a portion of the float must move in the oil in the interfacial zone. The viscosity of the oil should thus not be too high, both because it would impede the free movement of the float and would cause the oil to cling to the float. This heat correlation is particularly desirable in a float operated system in view of its tendency to maintain a clean interface in the interfacial zone 125. Accumulation of any considerable quantity of sludge in this zone will render the system inoperative because the sludge is of a density intermediate the oil and water and of a density approximately the same as the float 127. Due to the presence of a sludge layer in the container 10, it is usually impossible to position the float 127 directly therein. From this standpoint, the present invention has numerous advantages in using a float in conjunction with an auxiliary interface.

There are various ways of effecting this heat correlation in a float operated system. If desired, the float chamber 121 may be disposed within the container but I prefer to use an externally positioned float chamber 121 with a suitable jacket 135 therearound to provide an annular space 136 through which either one of the liquids withdrawn from the container 10 may be moved. As shown, all or a portion of the water rising in the pipe 93 may move downward through a pipe 140 provided with a valve 141 and enter the upper end of the space 136. This water thus moves in heat-transferring relationship with the interfacial zone 125 and is discharged through a pipe 142 into the funnel 58. If desired, some of the water rising in the pipe 93 may be by-passed through the pipe 94 by proper manipulation of valves 141 and 146.

With such a float operated system, there is usually a continuous flow of water from the container, the quantity of water thus withdrawn varying in response to movement of the float 127. This water will be at approximately the same temperature as the body of water in the container 10, thus securing the desired temperature correlation. In some instances, the oil withdrawn through the pipe 90 may be circulated in heat-transferring relationship with the interfacial zone without departing from the spirit of the invention. However, when used on an electric dehydrator, it is usually more convenient to use the water in this heat-transferring capacity, particularly as the water withdrawn from the dehydrator is, ordinarily slightly hotter than the oil withdrawn through the pipe 90. Further, it will be clear that the space 136 jacketing the interfacial zone 125 may be directly connected to the pipe 93, if desired, so that the water moves through this space immediately after leaving the container 10. Suitable heat-insulating means may be used around the float structure 122 and around the piping connecting the space 136 with the interior of the container 10.

Heat thus applied to the interfacial zone 125 will also tend to heat the column of oil in the pipe means 40. Thus, in some instances, it is not necessary to extend the upper portion of the pipe means 40 inside the container 10, as shown in Fig. 3. However, if this portion of the pipe means is disposed exterior of the container, it is usually desirable to heat-insulate it to prevent cooling of the oil column therein. Even in the structure shown in Fig. 3, it is sometimes desirable to heat-insulate the exposed piping 120 and 123, as indicated by the numerals 150 and 160.

While I have illustrated the invention in conjunction with an electric treater which continuously or intermittently receives a mixture of oil and water, it will be clear that the invention is not limited thereto. Even if no mixture is continuously supplied to the container, there are many instances in which the liquids in such a container are undergoing gravitational separation. For instance, in an oil storage tank, it will be found that a small quantity of water may gradually separate and the invention can be used to control the water level in such a tank, regardless of whether additional mixture is supplied thereto during the time that the invention is operating.

It will be clear that, if it is desired to use an interfacial zone which is outside the container 10 and control the withdrawal of one or both of the liquids from the container by an electrical system, a suitable contact electrode can be disposed in the interfacial zone 125 and connected as indicated in Fig. 1 without departing from the spirit of the invention.

Various other changes and modifications can be made without departing from the spirit of the invention.

I claim as my invention:

1. A method of controlling the relative amounts of two liquids of different density present in a container and forming therein an upper body of lower density liquid and a lower body of higher density liquid, at least one of which liquids changes in viscosity with change in temperature, said bodies being at a temperature above atmospheric, which method includes the steps of: maintaining superimposed columns of said two liquids in a separate upright passage by maintaining the upper end of said passage at all times during operation in communication with the upper of said bodies existing in said container and comprising said lower density liquid and maintaining the lower end of said passage in communication with the lower of said bodies existing in said container and comprising said higher density liquid whereby said columns contact at an interface in an interfacial zone of said passage which interface rises and falls with change in the relative amounts of said liquids in said container; transferring heat from at least one of said liquids in said container through the walls of said passage to at least one of said liquids in said passage to maintain the temperature of said interfacial zone substantially the same as the temperature in said container; and withdrawing at least one of said liquids from said container in response to changes in vertical position of said interface and in such amount as to maintain the position of said interface substantially constant.

2. A method of controlling the relative amounts of two liquids of different density present in a container and forming therein an upper body of lower density liquid and a lower body of higher density liquid, at least one of which liquids changes in viscosity with change in temperature, said bodies being at a temperature above atmospheric, which method includes the steps of: maintaining superimposed columns of said two liquids in a separate upright passage by maintaining the upper end of said passage at all times during operation in communication with the upper of said bodies existing in said container and comprising said lower density liquid and maintaining the lower end of said passage in communication with the lower of said bodies existing in said container and comprising said higher density liquid whereby said columns contact at an interface in an interfacial zone of said passage which interface rises and falls with change in the relative amounts of said liquids in said container; transferring heat from at least one of said liquids in said container to at least one of said liquids in said passage to maintain the temperature of said interfacial zone substantially the same as the temperature in said container; and withdrawing at least one of said liquids from said container through a conduit separate from said passage in response to changes in vertical position of said interface and in such amount as to maintain the position of said interface substantially constant.

3. A process as defined in claim 1 in which heat is transferred from at least one of said liquids in said container to a liquid in said passage by withdrawing one of said liquids from said container and passing the same in contact with the walls of said passage.

4. A process as defined in claim 1 in which heat is transferred from at least one of said liquids in said container to a liquid in said passage adjacent said interfacial zone by maintaining at least one of said liquids in said container in contact with walls of said passage surrounding said interfacial zone.

5. In combination in a system for controlling the relative amounts of two liquids of different density and present at superatmospheric temperature in a container and forming therein two bodies of liquid: a container for said bodies of liquid, the upper body being composed of the liquid of lower density and the lower body being composed of the liquid of higher density; walls defining an upright passage extending upward inside said container for at least a portion of its length to be in heat-transferring relationship with the contents of said container, the upper end of said passage communicating with said body of lower density liquid adjacent the top of said container and the lower end of said passage communicating with said body of higher density liquid adjacent the bottom of said container whereby an auxiliary interface is established in said passage between liquid columns respectively drawn from said bodies; withdrawal means for said lower density liquid above the point of communication of said passage with said lower density liquid; withdrawal means for said liquid of higher density; withdrawal control means for controlling the withdrawal of at least one of said liquids from said container through a conduit separate from said passage; means responsive to a rise and fall of said interface in said passage; and means operatively connecting said withdrawal control means and said means responsive to the rise and fall of said interface to withdraw liquid from said container in response to a change in vertical position of said interface in said passage.

6. In combination, in a system for controlling the relative amounts of two liquids of different density present at superatmospheric temperature in a container and forming therein two bodies of liquid: a container for said bodies of liquid, the upper body being composed of the liquid of lower density and the lower body being composed of the liquid of higher density; walls defining an upright passage having a midportion intermediate the top and bottom of said container and having at least a portion of its length in heat exchange relationship with at least one of said liquids, said passage extending a substantial distance above said midportion and communicating adjacent its upper end with said body of lower density liquid, said passage also extending a substantial distance below said midportion and communicating adjacent its lower end with said body of higher density liquid, whereby an interface is maintained in said passage between liquid columns respectively drawn from said bodies; withdrawal means for withdrawing said liquid of lower density and maintaining the upper surface of said liquid of lower density above the point of communication of said passage with said lower density liquid; withdrawal means for said liquid of higher density; and withdrawal control means for controlling the withdrawal of at least one of said liquids from said container through a conduit separate from said passage, said withdrawal control means including means responsive to the rise and fall of said interface in said passage, and means operatively connected with said responsive means for controlling the withdrawal of liquid through said conduit.

7. The combination defined in claim 6 in which a portion of said passage is positioned within said container in heat exchange relationship with a liquid in said container and said responsive means is positioned within said last named portion.

8. The combination defined in claim 6 in which a portion of said passage is positioned within said container in heat exchange relationship with a liquid in said container and said responsive means is positioned within said last named portion, said combination also including walls defining a side passage opening into said last named portion and extending outward through the walls of said container to provide a passage for operatively connecting said responsive means to said means for controlling the withdrawal of liquid through said conduit.

9. The combination defined in claim 6 in which said passage is provided with an opening in a side wall thereof and a closure for said opening, and said responsive means includes an electrode insertable through said opening and a connector means extending through said closure means including a flexible portion suspending said electrode in position to be contacted by said higher density liquid when said interface rises in said passage.

10. The combination defined in claim 6 in which the portion of the length of said passage in heat exchange relationship with said one of said liquids contains said interface and is provided with a jacket, and in which said combination includes means for conducting to said jacket one of said liquids withdrawn from said container to maintain a temperature of the liquids in said passage adjacent said interface substantially the same as the temperature in said container.

FRANCIS D. MAHONE.